(12) United States Patent
Suzuki

(10) Patent No.: US 9,606,330 B2
(45) Date of Patent: Mar. 28, 2017

(54) IMAGING LENS AND IMAGING APPARATUS

(71) Applicant: FUJIFILM Corporation, Tokyo (JP)

(72) Inventor: Takashi Suzuki, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/859,452

(22) Filed: Sep. 21, 2015

(65) Prior Publication Data

US 2016/0011404 A1    Jan. 14, 2016

Related U.S. Application Data

(63) Continuation-in-part of application No. 14/254,245, filed on Apr. 16, 2014, now abandoned.

(30) Foreign Application Priority Data

May 9, 2013    (JP) .................................. 2013-099180

(51) Int. Cl.
| | | |
|---|---|---|
| G02B 3/02 | (2006.01) | |
| G02B 13/00 | (2006.01) | |
| G02B 9/64 | (2006.01) | |
| G02B 5/00 | (2006.01) | |
| G02B 27/00 | (2006.01) | |
| G02B 13/16 | (2006.01) | |

(52) U.S. Cl.
CPC ......... *G02B 13/0045* (2013.01); *G02B 5/005* (2013.01); *G02B 9/64* (2013.01); *G02B 13/006* (2013.01); *G02B 13/16* (2013.01); *G02B 27/0025* (2013.01)

(58) Field of Classification Search
CPC ..................................................... G02B 13/18

USPC .......................................................... 359/708
See application file for complete search history.

(56) References Cited

U.S. PATENT DOCUMENTS

| | | |
|---|---|---|
| 7,903,348 B2 | 3/2011 | Sensui |
| 8,503,110 B2 | 8/2013 | Oshita |
| (Continued) | | |

FOREIGN PATENT DOCUMENTS

| | | |
|---|---|---|
| JP | 2006-171285 | 6/2006 |
| JP | 2009-237542 | 10/2009 |
| (Continued) | | |

OTHER PUBLICATIONS

Japanese Office Action dated Sep. 27, 2016 in corresponding Japanese Patent Application No. 2013-099180 with English translation of Japanese Office Action.

*Primary Examiner* — James Jones
(74) *Attorney, Agent, or Firm* — Young & Thompson

(57) ABSTRACT

An imaging lens composed of a positive first lens group, an aperture stop, a negative second lens group, and a positive third lens group disposed in order from the object side. The first lens group includes one negative lens and one positive lens disposed in order from the object side. The second lens group includes one negative lens and one positive lens, has at least one aspherical surface, and is composed of three lenses or less, in which the most object side surface and the most image side surface of the second lens group are concave and convex surfaces respectively. The third lens group is composed of a negative lens with a concave surface on the object side and one or more positive lenses disposed in order from the object side.

19 Claims, 10 Drawing Sheets

(56) References Cited

U.S. PATENT DOCUMENTS

| | | | |
|---|---|---|---|
| 8,587,880 B2* | 11/2013 | Suzuki | G02B 13/0045 359/716 |
| 2006/0126192 A1 | 6/2006 | Ryu et al. | |
| 2010/0201782 A1 | 8/2010 | Yamada et al. | |

FOREIGN PATENT DOCUMENTS

| | | |
|---|---|---|
| JP | 2009-258157 | 11/2009 |
| JP | 2010-186011 | 8/2010 |
| JP | 2011-059288 | 3/2011 |
| JP | 2012-063676 | 3/2012 |

* cited by examiner

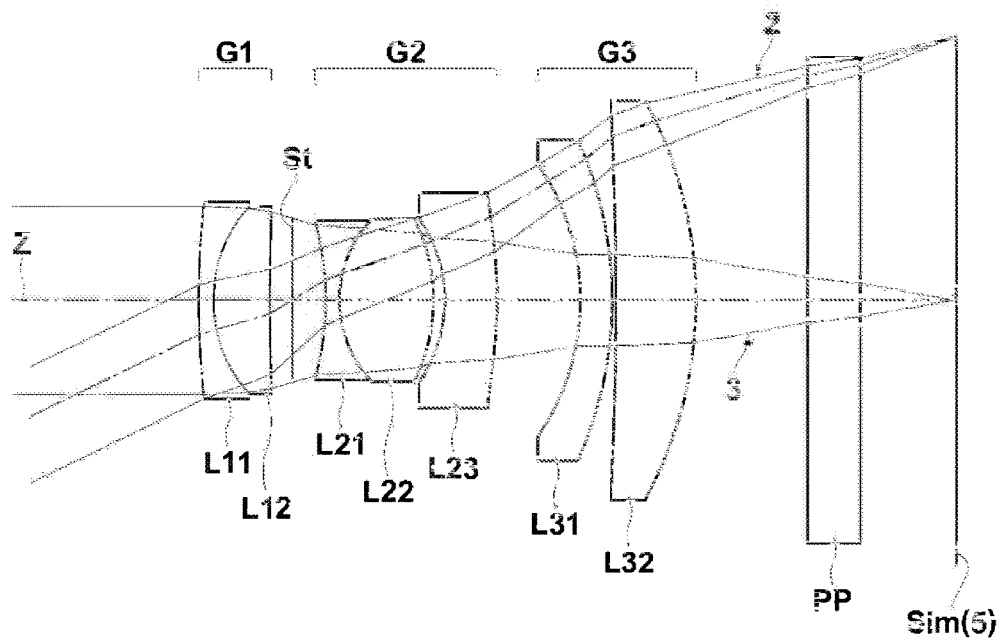
FIG.1 EXAMPLE 1
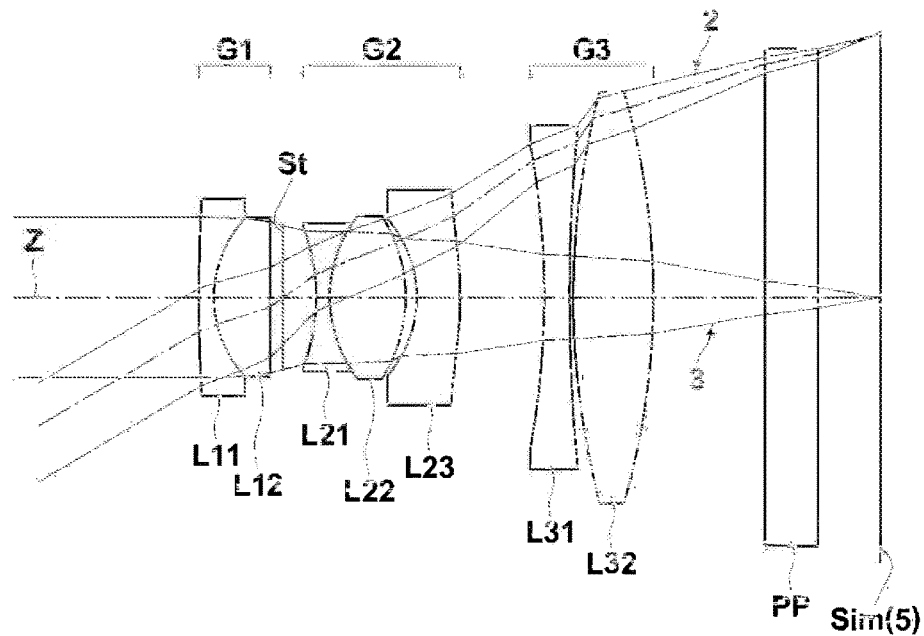
FIG.2 EXAMPLE 2

EXAMPLE 3

EXAMPLE 4

FIG.5 EXAMPLE 5

IMAGING LENS AND IMAGING APPARATUS

BACKGROUND OF THE INVENTION

Field of the Invention

The present invention relates to an imaging lens and imaging apparatus, and more specifically to an imaging lens suitably used for electronic cameras and the like, and an imaging apparatus equipped with such an imaging lens.

Description of the Related Art

In recent years, digital cameras equipped with large image sensors that comply with the APS format, Four-Thirds format, or the like have been supplied to the market in large quantities. Today, while using the large image sensors described above, not only digital single-lens reflex cameras but also interchangeable lens digital cameras without reflex viewfinders and compact cameras are supplied. The advantages of these cameras are that the entire system is compact and highly portable while being capable of providing high image quality.

As compact imaging lenses with small numbers of lenses, while corresponding to such larger image sensors, those described, for example, in Japanese Unexamined Patent Publication Nos. 2009-237542, 2009-258157, 2010-186011, 2011-059288, and 2012-063676 have been proposed. The imaging lenses described in Japanese Unexamined Patent Publication Nos. 2009-237542, 2009-258157, 2010-186011, and 2011-059288 have, in common, a lens configuration with a so-called retrofocus or equivalent power arrangement, in which a negative lens is disposed on the most object side, and a negative lens, a positive lens, and a positive lens are disposed in order from the aperture stop toward the image side. The imaging lens described in Japanese Unexamined Patent Publication No. 2012-063676 has a lens configuration in which a positive first lens group, a positive second lens group, and a negative third lens group are disposed in order from the object side, although a negative lens is disposed on the most object side.

SUMMARY OF THE INVENTION

For imaging lenses used as interchangeable lenses of cameras, in particular, single-lens reflex cameras, a long back focus may be required for inserting various kinds of optical elements between the lens system and the image sensor or for securing an optical path length for reflex viewfinder. In such a case, the retrofocus power arrangement is suitable.

The imaging lenses described in Japanese Unexamined Patent Publication Nos. 2009-237542, 2009-258157, 2010-186011, and 2011-059288 have the aforementioned lens configuration with the retrofocus or equivalent power arrangement. In such type of imaging lenses, however, an attempt to secure both a long back focus and high optical performance will inevitably result in that the entire optical length is extended and the imaging lenses may not respond to the recent demand for downsizing of imaging devices.

Further, in imaging devices that employ large image sensors, such as the APS format image sensors and the like, there may be cases in which long back focuses comparable to those of interchangeable lenses for single-lens reflex cameras are not required depending on the configuration, such as the interchangeable lens cameras without reflex viewfinders, integrated lens compact cameras, and the like.

The imaging lenses described in Japanese Unexamined Patent Publication Nos. 2009-237542, 2009-258157, 2010-186011, and 2011-059288 can be applied to the imaging devices that employ large image sensors, such as the aforementioned APS format image sensors and the like. If that is the case, however, it is necessary to downsize the imaging lenses according to the small and highly portable imaging devices.

The present invention has been developed in view of the circumstances described above, and it is an object of the present invention to provide an imaging lens which is compact while ensuring satisfactory optical performance compatible with a large image sensor. It is a further object of the present invention to provide an imaging apparatus equipped with the imaging lens.

An imaging lens of the present invention is composed of a first lens group having a positive refractive power, an aperture stop, a second lens group having a negative refractive power, and a third lens group having a positive refractive power disposed in order from the object side, wherein:

the first lens group includes one negative lens and one positive lens disposed in order from the object side;

the second lens group is composed of three lenses or less, includes one negative lens and one positive lens, and has at least one aspherical surface, wherein the most object side surface of the second lens group is a concave surface and the most image side surface of the second lens group is a convex surface; and the third lens group is composed of one negative lens with a concave surface on the object side and one or more positive lenses disposed in order from the object side.

The imaging lens of the present invention preferably satisfies a conditional expression:

$$-0.51 \leq f/f2 \leq -0.09$$

where:

f: the focal length of the entire system; and f2: the focal length of the second lens group.

In the imaging lens of the present invention, the second lens group is preferably composed of three lenses of a negative lens with a concave surface on the object side, a positive lens with a convex surface on the image side, and an aspherical lens disposed in order from the object side.

The imaging lens of the present invention preferably satisfies a conditional expression (1) given below and more preferably satisfies a conditional expression (1-1) given below.

$$2.1 < TL/Y < 3.0 \tag{1}$$

$$2.2 < TL/Y < 2.9 \tag{1-1}$$

where:

TL: the distance from the most object side lens surface of the first lens group to the image plane on the optical axis (air equivalent length is used for the back focus portion); and Y: the maximum image height.

The imaging lens of the present invention preferably satisfies a conditional expression (2) given below and more preferably satisfies a conditional expression (2-1) given below.

$$0.50 < \Sigma d/TL < 0.85 \tag{2}$$

$$0.55 < \Sigma d/TL < 0.80 \tag{2-1}$$

where:

Σd: the distance from the most object side lens surface of the first lens group to the most image side lens surface of the third lens group on the optical axis; and TL: the distance from the most object side lens surface in the first lens group to the image plane on the optical axis (air equivalent length is used for the back focus portion).

The imaging lens of the present invention preferably satisfies a conditional expression (3) given below and more preferably satisfies a conditional expression (3-1) given below.

$$0.35 < Y/f < 0.85 \quad (3)$$

$$0.40 < Y/f < 0.82 \quad (3\text{-}1)$$

where:
Y: the maximum image height; and
f: the focal length of the entire system.

The imaging lens of the present invention preferably satisfies a conditional expression (4) given below and more preferably satisfies a conditional expression (4-1) given below.

$$0.70 < ST/TL < 0.95 \quad (4)$$

$$0.75 < ST/TL < 0.92 \quad (4\text{-}1)$$

where:
ST: the distance from the aperture stop to the image plane on the optical axis (air equivalent length is used for the back focus portion); and
TL: the distance from the most object side lens surface of the first lens group to the image plane on the optical axis (air equivalent length is used for the back focus portion).

The imaging lens of the present invention preferably satisfies a conditional expression (5) given below.

$$0.7 < f/f1 < 1.6 \quad (5)$$

where:
f: the focal length of the entire system; and
f1: the focal length of the first lens group.

In the imaging lens of the present invention, the first lens group is preferably composed of two lenses of a negative meniscus lens having a convex surface on the object side and a positive lens disposed in order from the object side, and in which case, the two lenses constituting the first lens group is preferably cemented to each other.

Preferably, in the imaging lens of the present invention, the first and second lenses of the second lens group from the object side are a negative lens and a positive lens respectively and the two lenses are cemented to each other.

In the imaging lens of the present invention, the one positive lens included in the first lens group preferably satisfies conditional expressions (6) and (7) given below.

$$Nd1p > 1.70 \quad (6)$$

$$30 < vd1p < 58 \quad (7)$$

where:
Nd1p: the refractive index of the one positive lens included in the first lens group with respect to the d-line; and
vd1p: the Abbe number of the one positive lens included in the first lens group with respect to the d-line.

In the imaging lens of the present invention, the third lens group is preferably composed of two lenses of a negative lens and a positive lens.

The imaging lens of the present invention is preferably configured to perform focus adjustment from an object at infinity to an object at proximity by integrally moving only the first and second lens groups to the object side.

The imaging lens of the present invention preferably satisfies a conditional expression (8) given below.

$$0.9 < f12/f < 1.5 \quad (8)$$

where:
f12: the combined focal length of the first and second lens groups; and
f: the focal length of the entire system.

An imaging apparatus of the present invention includes the imaging lens of the present invention.

The term "composed of - - - - -" as used herein refers to substantive elements and the imaging lens of the present invention may include a lens with substantially no power, an optical element other than a lens, such as an aperture stop, a cover glass, a filter, and the like, a lens flange, a lens barrel, and a mechanical component, such as a camera shake correction mechanism, and the like, other than the components described above.

Note that the signs of the refractive powers and the surface shapes of the lenses of the imaging lens of the present invention described above are determined within the paraxial region for those involved with an aspherical surface.

The "maximum image height" described above may be obtained, for example, from the specs of the imaging lens or from the specs of an imaging apparatus on which the imaging lens is mounted.

According to the present invention, each lens group is configured properly, so that an imaging lens which is compact while ensuring satisfactory optical performance compatible with a large image sensor and an imaging apparatus equipped with the imaging lens may be provided.

BRIEF DESCRIPTION OF THE DRAWINGS

FIG. 1 is a cross-sectional view of an imaging lens of Example 1 of the present invention, illustrating the configuration thereof.

FIG. 2 is a cross-sectional view of an imaging lens of Example 2 of the present invention, illustrating the configuration thereof.

Figure 6:
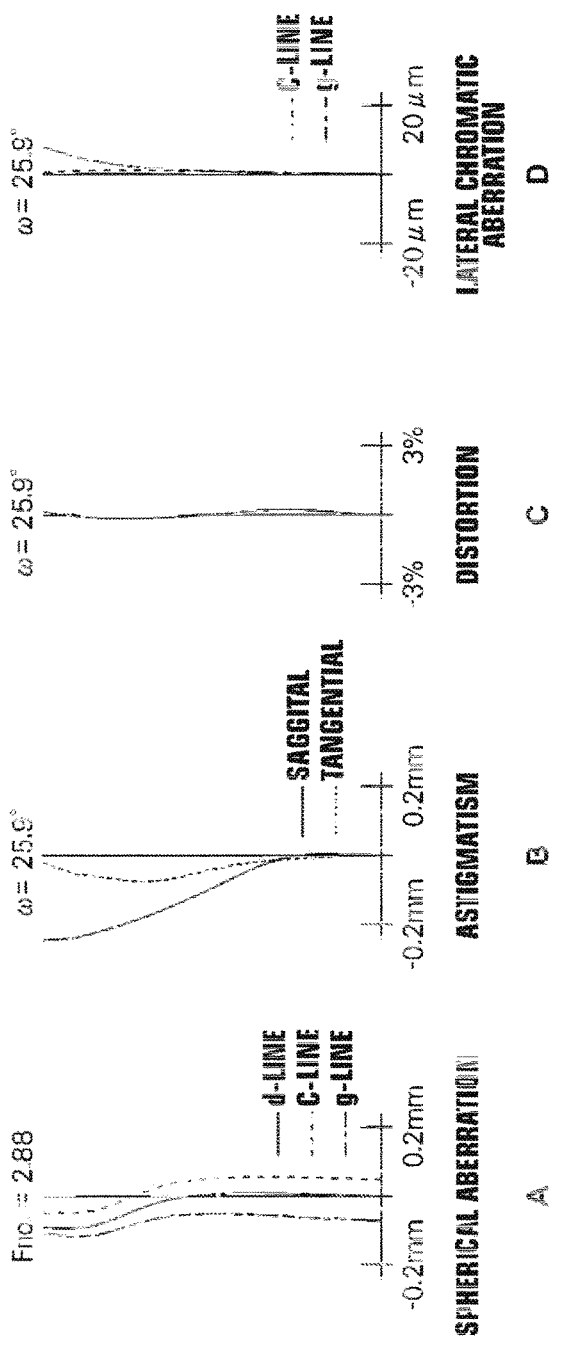

A to D of FIG. 6 are aberration diagrams of the imaging lens of Example 1 of the present invention.

Figure 7:
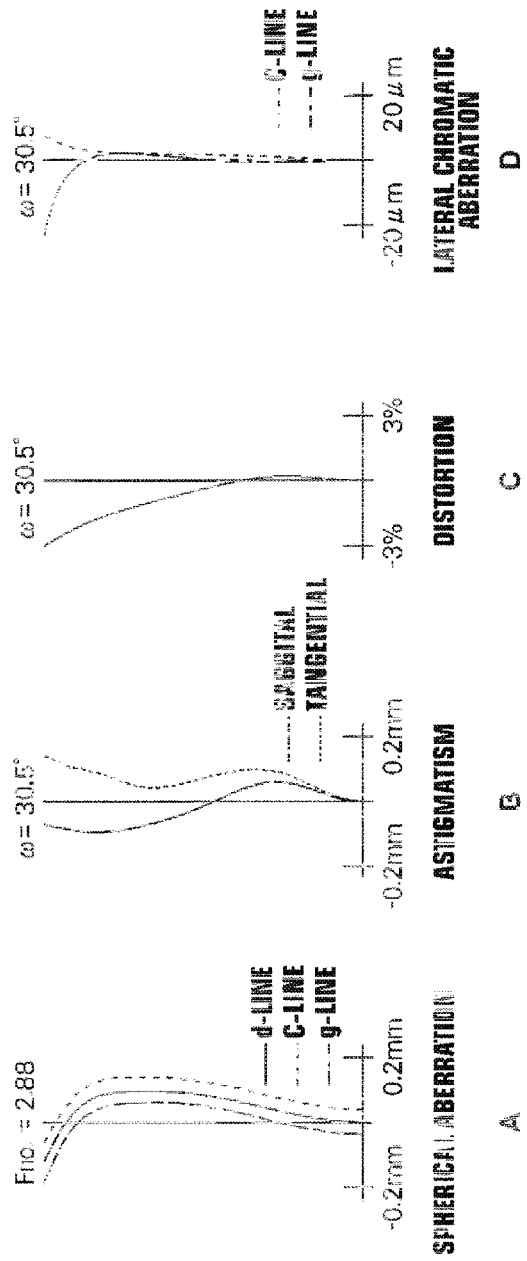

A to D of FIG. 7 are aberration diagrams of the imaging lens of Example 2 of the present invention.

Figure 8:
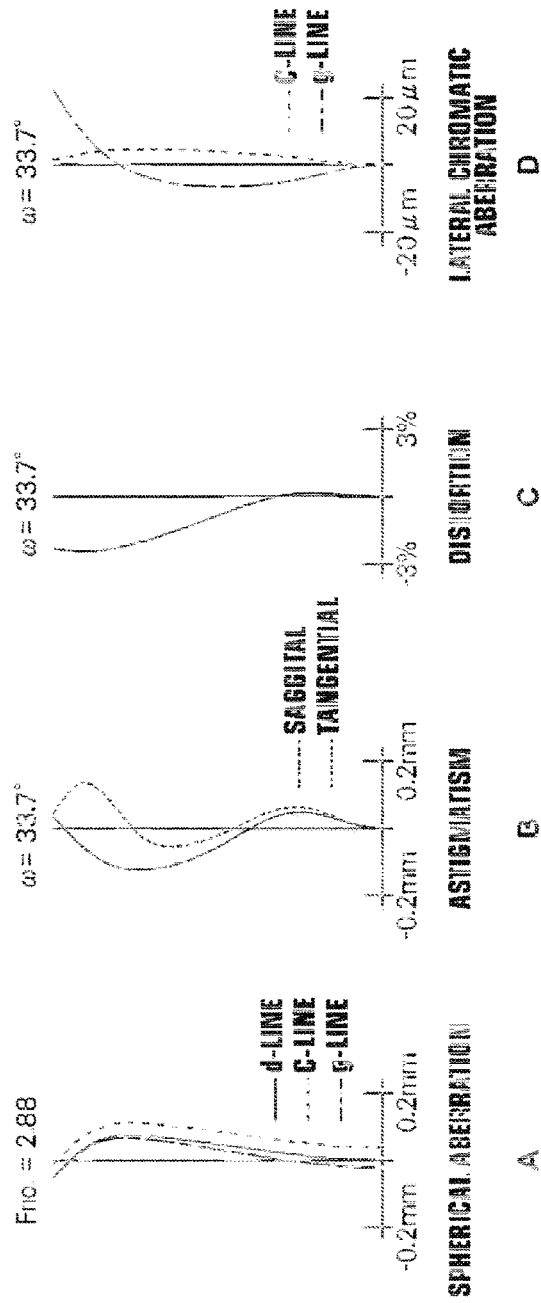

A to D of FIG. 8 are aberration diagrams of the imaging lens of Example 3 of the present invention.

Figure 9:
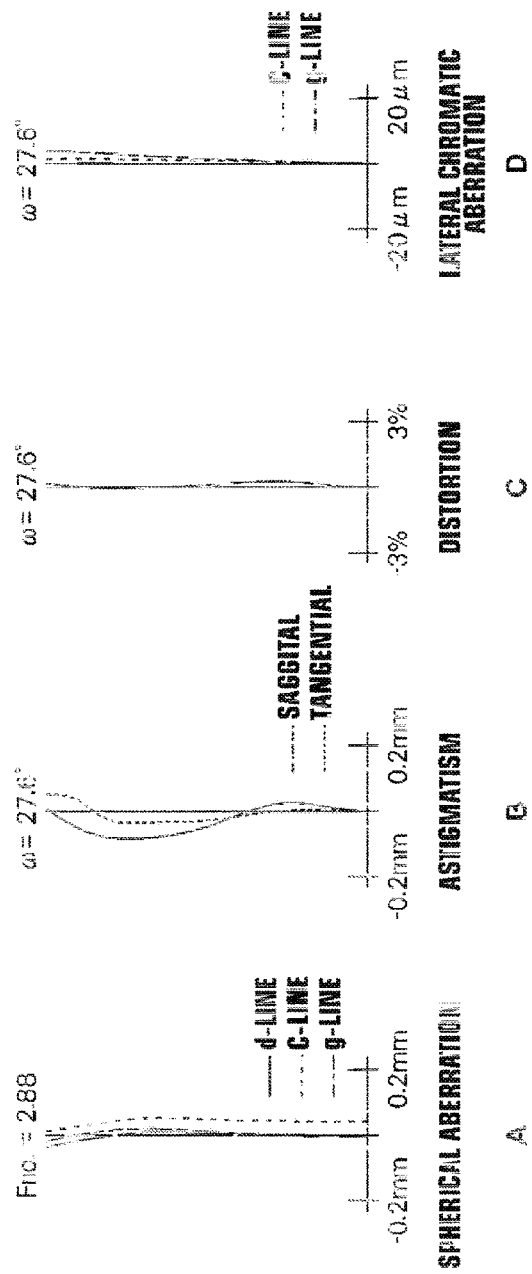

A to D of FIG. 9 are aberration diagrams of the imaging lens of Example 4 of the present invention.

Figure 10:
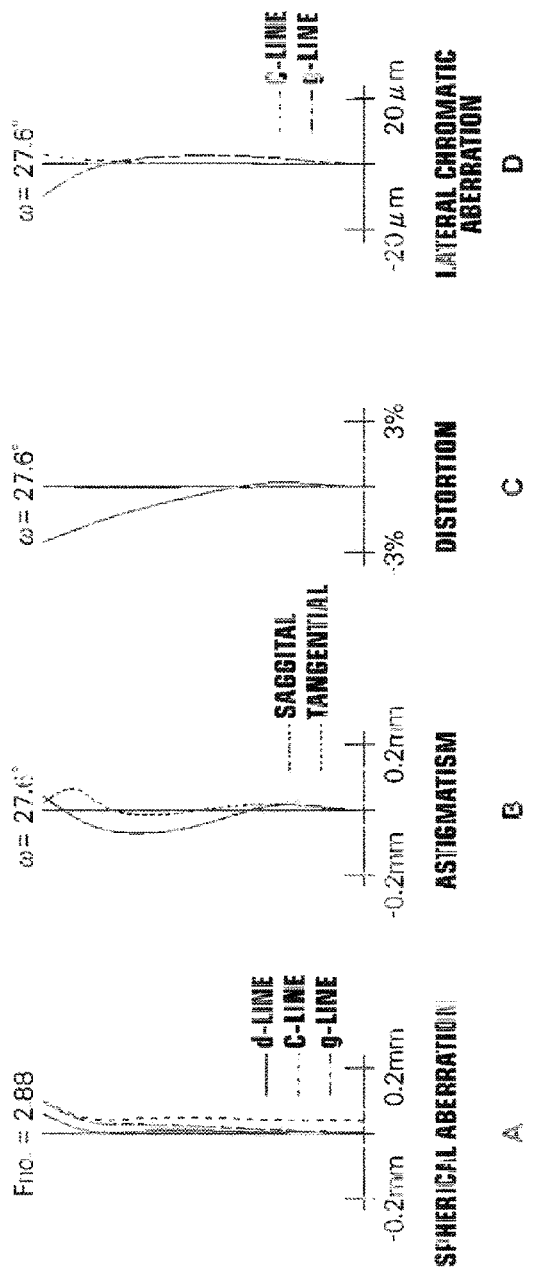

A to D of FIG. 10 are aberration diagrams of the imaging lens of Example 5 of the present invention.

Figure 11:
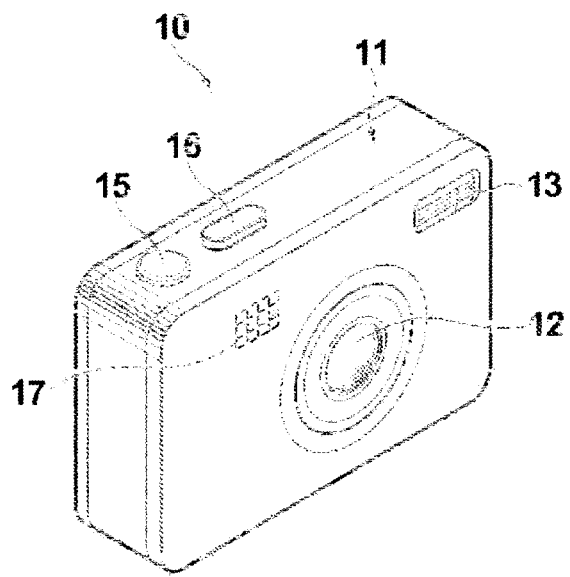

FIG. 11 is a perspective view of an imaging apparatus according to an embodiment of the present invention.

Figure 12A:
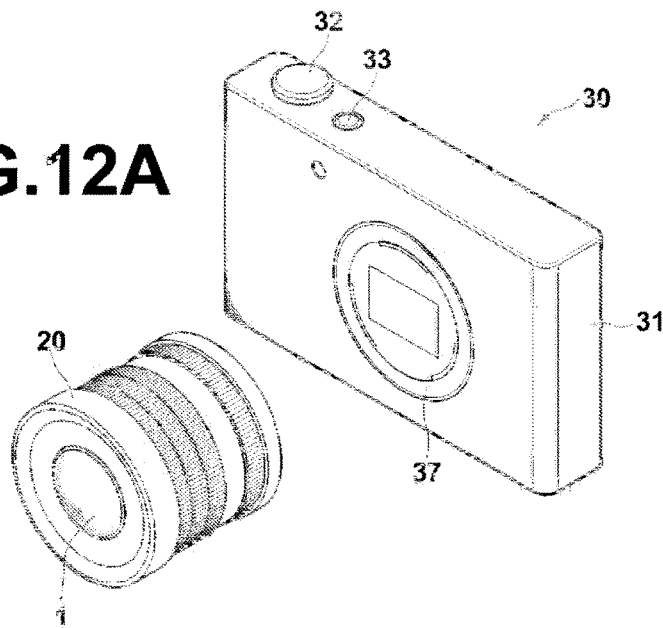

FIG. 12A is a front perspective view of an imaging apparatus according to an alternative embodiment of the present invention.

Figure 12B:
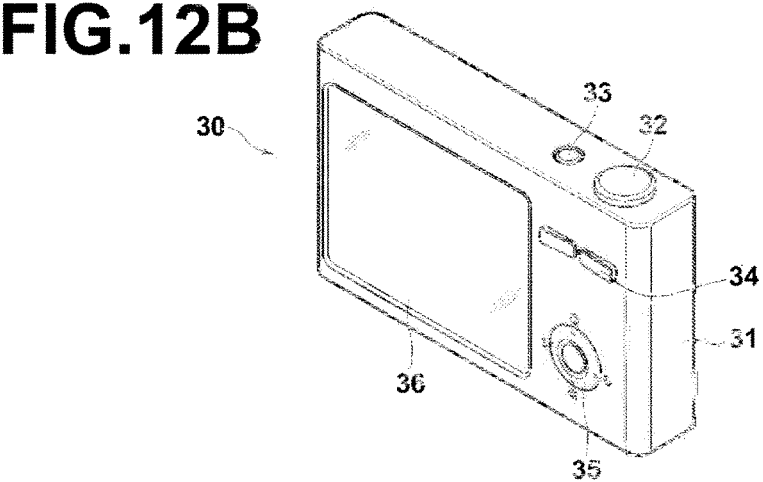

FIG. 12B is a rear perspective view of the imaging apparatus according to the alternative embodiment of the present invention.

DESCRIPTION OF THE PREFERRED EMBODIMENTS

Hereinafter, embodiments of the present invention will be described in detail with reference to the accompanying drawings. FIGS. 1 to 5 are cross-sectional views of imaging lenses according to embodiments of the present invention which correspond respectively to Example 1 to 5, to be described later. In FIGS. 1 to 5, the left side is the object side and the right side is the image side, and FIGS. 1 to 5 also show axial light rays 2 from an object at infinity and light rays 3 at the maximum image height. As the basic configurations of the examples illustrated in FIGS. 1 to 5 are identical and the illustration methods of FIGS. 1 to 5 are also identical, the description will be made hereinafter with reference to the configuration example shown in FIG. 1, as a representative example.

The imaging lens according to an embodiment of the present invention is composed of a first lens group G1 having a positive refractive power, an aperture stop St, a second lens group G2 having a negative refractive power, and a third lens group G3 having a positive refractive power disposed in order from the object side. The aperture stop St shown in each of FIGS. 1 to 5 does not necessarily represent the size and shape but indicates the position on the optical axis Z.

When the imaging lens is mounted on an imaging apparatus, it is conceivable that the imaging apparatus is configured to include a cover glass for protecting the image sensor, and various types of filters, as appropriate, according to the specs of the imaging apparatus, such as a low-pass filter, an infrared light cut filter, and the like. Therefore, FIG. 1 shows an example in which a parallel plate optical member PP that assumes these is disposed between the most image side lens surface and the image plane Sim. Note that, however, a configuration without the optical member PP is also possible in the present invention.

Although FIG. 1 shows an example in which the optical member PP is disposed between the lens system and the image plane Sim, the position of the optical member PP is not limited to that shown in FIG. 1 and, for example, various types of filters, such as low-pass filters, filters that cut specific wavelength ranges may be disposed between each lens. Alternatively, a coat having the same effect as that of the various filters may be formed on a lens surface of any lens.

Further, FIG. 1 also shows an image sensor 5 disposed at the image plane Sim of the imaging lens in consideration of the case in which the imaging lens is applied to an imaging apparatus. In FIG. 1, the image sensor 5 is schematically illustrated but, in actuality, the image sensor 5 is disposed such that the imaging surface of the image sensor 5 corresponds to the position of the image plane Sim. The image sensor 5 captures an optical image formed by the imaging lens and converts the image to an electrical signal, and, for example, a CCD (Charge Coupled Device), a CMOS (Complementary Metal Oxide Semiconductor), or the like may be used as the image sensor 5.

In the imaging lens of the present embodiment, the first lens group G1 has a positive refractive power, the second lens group G2 has a negative refractive power, and the third lens group G3 has a positive refractive power, which is advantageous for keeping down the overall optical length in comparison with a retrofocus lens system. In the imaging lens of the present embodiment, the first lens group G1 includes one negative lens and one positive lens disposed in order from the object side, the second lens group G2 is composed of three lenses or less, includes one negative lens and one positive lens, and has at least one aspherical surface, in which the most object side surface of the second lens group G2 is a concave surface and the most image side surface of the second lens group G2 is a convex surface, and the third lens group G3 is composed of one negative lens with a concave surface on the object side and one or more positive lenses disposed in order from the object side.

Inclusion of one negative lens and one positive lens disposed in order from the object side in the first lens group G1 is advantageous for the correction of spherical aberration, field curvature, distortion, and the like. Configuration of the second lens group G2 with three lenses or less is advantageous for downsizing. Inclusion of one negative lens and one positive lens in the second lens group G2 which is disposed immediately following the aperture stop St on the image side and is middle lens group of the three lens groups is advantageous for the correction of longitudinal chromatic aberration. As the second lens group G2 has at least one aspherical surface, it becomes easy to satisfactorily correct field curvature of off-axis aberration and distortion. Configuration of the third lens groups G3 with one negative lens and one or more positive lenses disposed in order from the object side makes it easy to satisfactorily correct field curvature.

As the most object side surface of the second lens group G2 is a concave surface, the most image side surface of the second lens group G2 is a convex surface, and the most object side surface of the third lens group G3 is a concave surface, an off-axis light ray with a large angle of view is prevented from refracting largely at each surface, thereby reducing the amount of aberrations generated. Although, this effect may be obtained by each surface alone, the configuration of the three surfaces in the manner described above may reduce the amount of aberrations more effectively.

According to the imaging lens of the present embodiment configured in the manner described above, the imaging lens may be manufactured compact, and may sufficiently correct various types of aberrations, including spherical aberration, field curvature, and distortion, to ensure satisfactory optical performance compatible with a large image sensor.

Preferably, each lens group further takes the following configurations. The first lens group G1 is preferably composed of two lenses of a lens L11 which is a negative meniscus lens with a convex surface on the object side and a lens L12 which is a positive lens disposed in order from the object side. If the first lens group G1 is configured in this way, the spherical aberration, field curvature, distortion, and the like generated in the first lens group G1 may be corrected in a well balanced manner. In addition, composition of the first lens group G1 with minimum of two lenses is advantageous for downsizing and cost reduction of the lens system.

In the case where the first lens group G1 is composed of the aforementioned two lenses, it is preferable that the two lenses are cemented to each other. The use of the cemented lens in the first lens group G1 allows satisfactory correction of field curvature to be realized.

The second lens group G2 is preferably composed of three lenses of a lens L21 which is a negative lens with a concave surface on the object side, a lens L22 which is a positive lens with a convex surface on the image side, and a lens L23 which is an aspherical lens disposed in order from the object side. If the second lens group G2 is configured in this way, the spherical aberration, field curvature, distortion, and the like generated in the second lens group G2 may be corrected in a well balanced manner. The disposition of the aspherical lens at a position remote from the aperture stop St allows field curvature of off-axis aberration and distortion to be corrected satisfactorily. In addition, composition of the second lens group G2 with minimum of three lenses is advantageous for downsizing and cost reduction of the lens system.

In the case where a negative lens and a positive lens are used respectively as the first lens and the second lens of the second lens group from the object side, it is preferable that the two lenses are cemented to each other. The use of the cemented lens in which the negative lens and the positive lens are cemented in the second lens group allows satisfactory achromatization to be realized.

For example, the second lens group G2 may be composed of a cemented lens in which a biconcave lens and a biconvex lens are cemented and a meniscus negative lens having an aspherical surface with a concave surface on the object side in the paraxial region disposed in order from the object side.

The third lens group G3 is preferably composed of two lenses of a lens L31 which is a negative lens and a lens L32 which is a positive lens. Composition of the third lens group G3 with two lenses of the negative lens and the positive lens disposed in order from the object side allows the field curvature of off-axis aberration to be corrected satisfactorily. Further, composition with minimum of two lenses is advantageous for downsizing and cost reduction of the lens system.

Further, the imaging lens of the present embodiment is preferably configured to perform focus adjustment from an object at infinity to an object at proximity by a front focusing system in which only the first lens group G1 and the second lens group G2 are integrally moved to the object side. As the aperture stop St is located nearer to the object side, the lenses of the first lens group G1 and the second lens group G2 have small diameters and are relatively lightweight. Employment of the front focusing system described above allows the burden of the drive mechanism to be reduced in comparison with the system in which the entire system is moved or the rear focus system in which the image side lens group with lenses having large diameters and weight is moved, which is advantageous for downsizing of the apparatus.

Preferably, the imaging lens of the present embodiment satisfies any one of conditional expressions (0) to (8) given below or any combination thereof.

$$-0.51 \leq f/f2 \leq -0.09 \quad (0)$$

$$2.1 < TL/Y < 3.0 \quad (1)$$

$$0.50 < \Sigma d/TL < 0.85 \quad (2)$$

$$0.35 < Y/f < 0.85 \quad (3)$$

$$0.70 < ST/TL < 0.95 \quad (4)$$

$$0.7 \leq f/f1 < 1.6 \quad (5)$$

$$Nd1p > 1.70 \quad (6)$$

$$30 < vd1p < 58 \quad (7)$$

$$0.9 < f12/f < 1.5 \quad (8)$$

where:
  f: the focal length of the entire system;
  f2: the focal length of the second lens group;
  TL: the distance from the most object side lens surface of the first lens group to the image plane on the optical axis (air equivalent length is used for back focus portion);
  Y: the maximum image height;
  Σd: the distance from the most object side lens surface of the first lens group to the most image side lens surface of the third lens group on the optical axis;
  ST: the distance from the aperture stop to the image plane on the optical axis (air equivalent length is used for back focus portion);
  f1: the focal length of the first lens group;
  Nd1p: the refractive index of the one positive lens included in the first lens group with respect to the d-line;
  vd1p: the Abbe number of the one positive lens included in the first lens group with respect to the d-line; and
  f12: the combined focal length of the first lens group and the second lens group.

The conditional expression (0) defines a preferable range of the ratio between the focal length f of the entire system and the focal length f2 of the second lens group G2. By configuring the imaging lens so as to satisfy the conditional expression (0), it becomes easy to correct field curvature, while keeping down the overall optical length. In the case the focus adjustment is performed through the front focusing system described above and the conditional expression (0) is satisfied, aberration variation at the time of focus adjustment may be inhibited.

The conditional expression (1) defines a preferable range of the ratio between the overall optical length TL and the maximum image height Y. By configuring the imaging lens so as not to exceed the upper limit of the conditional expression (1), the entire lens system is prevented from increasing and may be formed compact, thereby being suitable for use with highly portable imaging devices. On the other hand, by configuring the imaging lens so as not to fall below the lower limit of the conditional expression (1), it becomes easy to correct spherical aberration and field curvature over the entire lens system.

In order to further enhance the advantageous effect with respect to the conditional expression (1) described above, it is more preferable that the imaging lens satisfies a conditional expression (1-1) given below.

$$2.2 < TL/Y < 2.9 \quad (1-1)$$

The conditional expression (2) defines a preferable range of the ratio of the lens portion to the overall optical length TL. By configuring the imaging lens so as not to exceed the upper limit of the conditional expression (2), while limiting the overall optical length to a certain length, the necessary back focus may be secured. Further, by configuring the imaging lens so as not to exceed the upper limit of the conditional expression (2), while securing the necessary back focus, the lens system may be prevented from increasing. On the other hand, by configuring the imaging lens so as not to fall below the lower limit of the conditional expression (2), while limiting the overall optical length to a certain length, the ratio of the lens portion is secured so as not to become too small and more lenses may be disposed in comparison with the case in which the imaging lens falls below the lower limit of the conditional expression (2), thereby making it easy to correct spherical aberration and field curvature over the entire lens system.

In order to further enhance the advantageous effect with respect to the conditional expression (2) described above, it is more preferable that the imaging lens satisfies a conditional expression (2-1) given below.

$$0.55 < \Sigma d/TL < 0.80 \quad (2-1)$$

The conditional expression (3) defines a preferable range of the ratio between the maximum image height Y and the focal length f of the entire system. By configuring the imaging lens so as not to exceed the upper limit of the conditional expression (3), the correction of field curvature and lateral chromatic aberration is prevented from becoming difficult due to reduced focal length of the entire system. By configuring the imaging lens so as not fall below the lower limit of the conditional expression (3), the focal length of the entire system is prevented from increasing which is advantageous for downsizing, and the imaging lens becomes suitable for use with thin imaging devices.

In order to further enhance the advantageous effect with respect to the conditional expression (3) described above, it is more preferable that the imaging lens satisfies a conditional expression (3-1) given below.

$$0.40 < Y/f < 0.82 \quad (3\text{-}1)$$

The conditional expression (4) defines a preferable range of the ratio between the overall optical length TL and the distance ST from the position of the aperture stop St to the image plane Sim. By configuring the imaging lens so as not to exceed the upper limit of the conditional expression (4), a lens space on the object side of the aperture stop St is secured and a lens group may be composed of an appropriate number of lenses without forcibly reducing the curvatures of the lenses, so that various types of aberrations may be corrected satisfactorily. On the other hand, by configuring the imaging lens so as not to fall below the lower limit of the conditional expression (4), the position of the aperture stop St is prevented from coming too close to the image sensor 5 and the incident angle of an off-axis light ray incident on the image sensor 5 is prevented from being excessively increased.

In order to further enhance the advantageous effect with respect to the conditional expression (4) described above, it is more preferable that the imaging lens satisfies a conditional expression (4-1) given below.

$$0.75 < ST/TL < 0.92 \quad (4\text{-}1)$$

The conditional expression (5) defines a preferable range of the ratio between the focal length f of the entire system and the focal length f1 of the first lens group G1. By configuring the imaging lens so as not to exceed the upper limit of the conditional expression (5), it becomes easy to correct spherical aberration and distortion generated in the first lens group G1. On the other hand, by configuring the imaging lens so as not to fall below the lower limit of the conditional expression (5), the overall optical length is prevented from increasing due to increased focal length of the first lens group G1, and the imaging lens may be formed compact.

In order to further enhance the advantageous effect with respect to the conditional expression (5) described above, it is more preferable that the imaging lens satisfies a conditional expression (5-1) given below.

$$0.8 < f/f1 < 1.5 \quad (5\text{-}1)$$

The conditional expression (6) defines a preferable range of the refractive index of the one positive lens disposed in the first lens group G1. By selecting the material such that the positive lens does not fall below the lower limit of the conditional expression (6), the control of Petzval sum becomes easy and the correction of field curvature becomes easy. If the positive lens falls below the lower limit of the conditional expression (6), the control of Petzval sum becomes difficult and the correction of field curvature becomes difficult. In order to avoid this, it is necessary to increase the overall optical length. By forming the positive lens so as not to fall below the lower limit of the conditional expression (6), such a situation may be avoided.

In order to further enhance the advantageous effect with respect to the conditional expression (6) described above, it is more preferable that the imaging lens satisfies a conditional expression (6-1) given below.

$$Nd1p > 1.73 \quad (6\text{-}1)$$

The conditional expression (7) defines a preferable range of the Abbe number of the one positive lens disposed in the first lens group G1. By selecting the material such that the positive lens falls within the range of the conditional expression (7), it becomes easy to correct chromatic aberrations, in particular, longitudinal chromatic aberration.

In order to further enhance the advantageous effect with respect to the conditional expression (7) described above, it is more preferable that the imaging lens satisfies a conditional expression (7-1) given below.

$$33 < vd1p < 55 \quad (7\text{-}1)$$

The simultaneous satisfaction of the conditional expressions (6) and (7) by the one positive lens of the lenses included in the first lens group G1 makes it easy to correct field curvature and chromatic aberrations, in particular, longitudinal chromatic aberration. The one positive lens that satisfies the conditional expressions (6) and (7) more preferably satisfies at least either one of the conditional expression (6-1) and (7-1).

The conditional expression (8) defines a preferable range of the ratio between the combined focal length f12 of the first lens group G1 and the second lens group G2 and the focal length f of the entire system. By configuring the imaging lens so as not to exceed the upper limit of the conditional expression (8), the overall optical length is prevented from increasing, which is advantageous for downsizing. By configuring the imaging lens so as not to fall below the lower limit of the conditional expression (8), it becomes easy to correct field curvature.

In the case where the focus adjustment is performed through the front focusing system in which only the first lens group G1 and the second lens group G2 are integrally moved, the conditional expression (8) serves to define a preferable range of the ratio between the focal length of the focusing groups and the focal length f of the entire system. In the case where such front focusing system is employed, by configuring the imaging lens so as not to exceed the upper limit of the conditional expression (8), the amount of movement of the lens groups at the time of focus adjustment may be limited, which is advantageous for downsizing. By configuring the imaging lens so as not to fall below the lower limit of the conditional expression (8), aberration variation at the time of focus adjustment may be inhibited.

In order to further enhance the advantageous effect with respect to the conditional expression (8) described above, it is more preferable that the imaging lens satisfies a conditional expression (8-1) given below.

$$0.95 < f12/f < 1.4 \quad (8\text{-}1)$$

The aforementioned preferable configurations may be combined arbitrary, and are preferably selected, as appropriate, according to the specs of the imaging lens. An optical system which has more satisfactory optical performance or compatible with high specs may be realized.

Numerical examples of the imaging lens of the present invention will now be described.

Example 1

The lens cross-sectional view of the imaging lens of Example 1 is that shown in FIG. 1. As the illustration method of FIG. 1, and the lens groups and each lens in the configuration example shown in FIG. 1 have already been described in detail, so that the description thereof is not repeated hear.

The basic lens data and aspherical surface coefficients are shown in Tables 1 and 2 respectively. The symbols f, BF, 2ω, Fno. shown at the top outside the box of Table 1 are focal length of the entire system, back focus (air equivalent length), total angle of view, and F-number respectively, which are all with respect to the d-line.

In Table 1, the Si section indicates $i^{th}$ surface number in which a number i (i=1, 2, 3, - - -) is given to each surface of each component in a serially increasing manner toward the image side with the object side surface of the most object side component being taken as the first surface. The Ri section indicates the radius of curvature of $i^{th}$ surface and the Di section indicates the surface distance between $i^{th}$ surface and $(i+1)^{th}$ surface on the optical axis Z. The Ndj section indicates the refractive index of $j^{th}$ component with respect to the d-line (587.56 nm) in which a number j (j=1, 2, 3, - - -) is given to each component in a serially increasing manner toward the image side with the most object side component being taken as the first component, and the vdj section indicates the Abbe number of $j^{th}$ component with respect to the d-line.

Note that Table 1 includes the aperture stop St and the optical member PP and "(St)" is indicated in the surface number field of the Si section corresponding to the aperture stop St in addition to the surface number. Note that the sign of the radius of curvature is positive if the surface shape is convex on the object side and negative if the surface shape is convex on the image side.

In Table 1, the surface whose surface number has an asterisk mark "*" is an aspherical surface and a value of paraxial radius of curvature is shown in the section of the radius of curvature of the aspherical surface. The Si section in Table 2 shows surface numbers of aspherical surfaces. The "E-n" (n: integer) in the values of aspherical surface coefficients in Table 2 refers to "$\times 10^{-n}$".

The aspherical surface coefficients are the values of coefficients K and Am (m=3, 4, 5, - - - , 20) in an aspherical surface expression given below.

$$Zd = C \cdot h^2 / \{1 + (1 - K \cdot C^2 \cdot h^2)^{1/2}\} \Sigma Am \cdot h^m$$

where

Zd: depth of aspheric surface (length of vertical line from a point on the aspheric surface at height h to a flat surface orthogonal to the optical axis to which the aspherical apex contacts);

h: height (distance from the optical axis to lens surface);

C: paraxial curvature; and

K, Am: aspherical surface coefficients (m=3, 4, 5, - - - , 20).

In each table shown hereinafter, "degree" is used as the unit of angle and "mm" is used as the unit of length, but other appropriate units may also be used because optical systems are usable even when they are proportionally enlarged or reduced. Further, values in the tables shown below are rounded to a predetermined digit.

TABLE 1

Example 1 Basic Lens Data
f = 29.19, BF = 13.01, 2ω = 51.8, Fno. = 2.88

| Si | Ri | Di | Ndj | vdj |
|---|---|---|---|---|
| 1 | 48.297 | 0.80 | 1.59270 | 35.3 |
| 2 | 7.557 | 3.04 | 1.91082 | 35.3 |
| 3 | 122.738 | 1.22 | | |
| 4(St) | ∞ | 1.80 | | |
| 5 | −15.443 | 0.70 | 1.59270 | 35.3 |
| 6 | 6.416 | 5.06 | 1.62041 | 60.3 |
| 7 | −9.746 | 0.60 | | |
| *8 | −7.554 | 2.80 | 1.58313 | 59.5 |
| *9 | −22.919 | 4.50 | | |
| 10 | −12.915 | 1.70 | 1.84666 | 23.8 |
| 11 | −21.162 | 0.20 | | |
| 12 | −202.774 | 4.30 | 1.90366 | 31.3 |
| 13 | −22.487 | 6.00 | | |
| 14 | ∞ | 2.80 | 1.51680 | 64.2 |
| 15 | ∞ | | | |

TABLE 2

Example 1 Aspherical Surface Coefficients

| Si | 8 | 9 |
|---|---|---|
| K | 0.0000000E+00 | 0.0000000E+00 |
| A3 | 6.9622149E−03 | 6.2340893E−03 |
| A4 | −1.7251603E−02 | −1.0743830E−02 |
| A5 | 2.2394554E−02 | 9.6956861E−03 |
| A6 | −1.5275629E−02 | −3.9915108E−03 |
| A7 | 3.1350624E−03 | −1.2002494E−04 |
| A8 | 2.6653676E−03 | 8.1445534E−04 |
| A9 | −1.9393093E−03 | −2.8017286E−04 |
| A10 | 2.5998419E−04 | −3.9636624E−06 |
| A11 | 1.7720892E−04 | 2.3185531E−05 |
| A12 | −6.8579204E−05 | −4.0771733E−06 |
| A13 | −9.9188983E−07 | −5.2082735E−07 |
| A14 | 4.5920468E−06 | 2.3298727E−07 |
| A15 | −6.0414099E−07 | −1.1418578E−08 |
| A16 | −1.0345902E−07 | −4.3437939E−09 |
| A17 | 2.8011243E−08 | 5.8129007E−10 |
| A18 | −2.2694472E−10 | 1.3062657E−11 |
| A19 | −4.0009448E−10 | −6.2155182E−12 |
| A20 | 2.8985323E−11 | 3.0227519E−13 |

A to D of FIG. 6 are aberration diagrams of spherical aberration, astigmatism, distortion, and lateral chromatic aberration of the imaging lens of Example 1 when focused on an object at infinity. The "Fno." in the spherical aberration diagram represents the F-number and the "ω" in the other aberration diagrams represents the half angle of view. Each aberration diagram illustrates aberration with the d-line (587.56 nm) as the reference wavelength. The spherical aberration diagram also illustrates aberrations with respect to the C-line (wavelength of 656.27 nm) and the g-line (wavelength of 435.84 nm), and the lateral chromatic aberration diagram illustrates aberrations with respect to the C-line and the g-line. In the astigmatism diagram, the solid line illustrates astigmatism in the sagittal direction while the dotted line illustrates astigmatism in the tangential direction.

The illustration method, symbols used in each table and their meanings, and description method with respect to the data of Example 1 will apply to the following examples unless otherwise specifically described.

Example 2

The lens cross-sectional view of the imaging lens of Example 2 is that shown in FIG. 2. The basic lens data and aspherical surface coefficients of the imaging lens of Example 2 are shown in Tables 3 and 4 respectively. The aberration diagrams of the imaging lens of Example 2 are shown in A to D of FIG. 7 respectively.

TABLE 3

Example 2 Basic Lens Data
f = 24.83, BF = 11.22, 2ω = 61.0, Fno. = 2.88

| Si | Ri | Di | Ndj | vdj |
|---|---|---|---|---|
| 1 | 96.878 | 0.80 | 1.48749 | 70.2 |
| 2 | 6.359 | 3.04 | 1.75500 | 52.3 |
| 3 | −349.320 | 0.67 | | |
| 4(St) | ∞ | 1.80 | | |
| 5 | −10.527 | 0.70 | 1.62588 | 35.7 |
| 6 | 7.200 | 4.08 | 1.72916 | 54.7 |
| 7 | −8.208 | 0.60 | | |
| *8 | −6.244 | 2.35 | 1.58313 | 59.5 |
| *9 | −20.424 | 4.50 | | |
| 10 | −45.305 | 1.36 | 1.84666 | 23.8 |
| 11 | 97.196 | 0.20 | | |
| 12 | 44.184 | 4.30 | 1.90366 | 31.3 |
| 13 | −39.435 | 6.00 | | |
| 14 | ∞ | 2.80 | 1.51680 | 64.2 |
| 15 | ∞ | | | |

TABLE 4

Example 2 Aspherical Surface Coefficients

| Si | 8 | 9 |
|---|---|---|
| K | 0.0000000E+00 | 0.0000000E+00 |
| A3 | 7.1460242E−03 | 6.5385047E−03 |
| A4 | −1.7435340E−02 | −1.0741587E−02 |
| A5 | 2.2383922E−02 | 9.7005171E−03 |
| A6 | −1.5276262E−02 | −3.9909393E−03 |
| A7 | 3.1350278E−03 | −1.1998465E−04 |
| A8 | 2.6653659E−03 | 8.1445762E−04 |
| A9 | −1.9393094E−03 | −2.8017274E−04 |
| A10 | 2.5998419E−04 | −3.9636571E−06 |
| A11 | 1.7720892E−04 | 2.3185531E−05 |
| A12 | −6.8579204E−05 | −4.0771733E−06 |
| A13 | −9.9188983E−07 | −5.2082735E−07 |
| A14 | 4.5920468E−06 | 2.3298727E−07 |
| A15 | −6.0414099E−07 | −1.1418578E−08 |
| A16 | −1.0345902E−07 | −4.3437939E−09 |
| A17 | 2.8011243E−08 | 5.8129007E−10 |
| A18 | −2.2694472E−10 | 1.3062657E−11 |
| A19 | −4.0009448E−10 | −6.2155182E−12 |
| A20 | 2.8985323E−11 | 3.0227519E−13 |

Example 3

Figure 3:
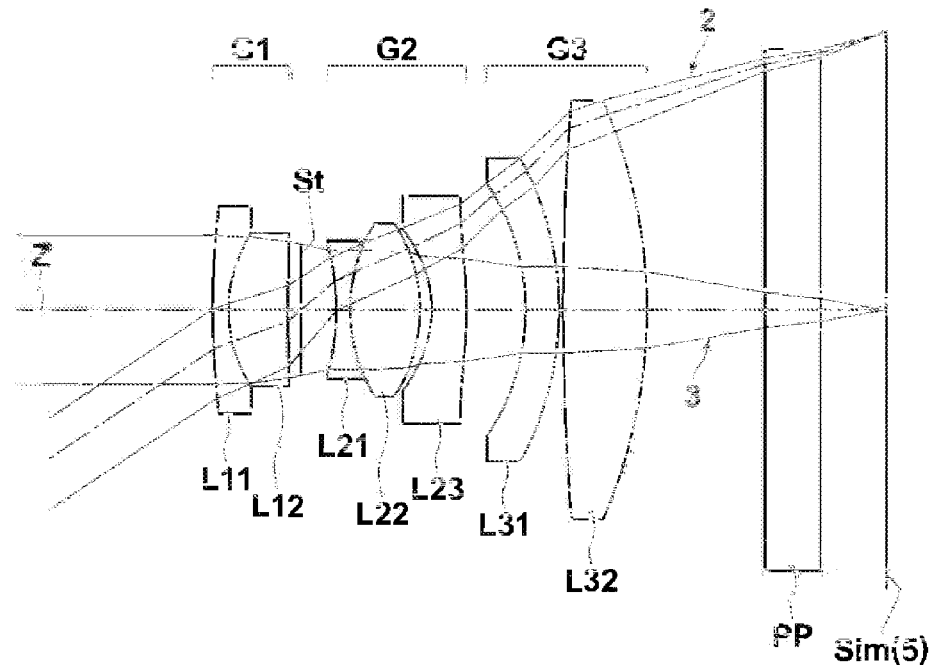
FIG. 3 is a cross-sectional view of an imaging lens of Example 3 of the present invention, illustrating the configuration thereof.

The lens cross-sectional view of the imaging lens of Example 3 is that shown in FIG. 3. The basic lens data and aspherical surface coefficients of the imaging lens of Example 3 are shown in Tables 5 and 6 respectively. The aberration diagrams of the imaging lens of Example 3 are shown in A to D of FIG. 8 respectively.

TABLE 5

Example 3 Basic Lens Data
f = 21.82, BF = 11.23, 2ω = 67.4, Fno. = 2.88

| Si | Ri | Di | Ndj | vdj |
|---|---|---|---|---|
| 1 | 44.615 | 0.80 | 1.57099 | 50.8 |
| 2 | 7.201 | 3.04 | 1.88300 | 40.8 |
| 3 | 128.410 | 0.67 | | |
| 4(St) | ∞ | 1.80 | | |
| 5 | −12.618 | 0.70 | 1.76182 | 26.5 |

TABLE 5-continued

Example 3 Basic Lens Data
f = 21.82, BF = 11.23, 2ω = 67.4, Fno. = 2.88

| Si | Ri | Di | Ndj | vdj |
|---|---|---|---|---|
| 6 | 8.489 | 3.57 | 1.83481 | 42.7 |
| 7 | −8.118 | 0.60 | | |
| *8 | −5.744 | 1.75 | 1.58313 | 59.5 |
| *9 | −18.890 | 3.03 | | |
| 10 | −11.558 | 1.70 | 1.84666 | 23.8 |
| 11 | −16.184 | 0.20 | | |
| 12 | 137.640 | 4.29 | 1.88300 | 40.8 |
| 13 | −26.601 | 6.00 | | |
| 14 | ∞ | 2.80 | 1.51680 | 64.2 |
| 15 | ∞ | | | |

TABLE 6

Example 3 Aspherical Surface Coefficients

| Si | 8 | 9 |
|---|---|---|
| K | 0.0000000E+00 | 0.0000000E+00 |
| A3 | 8.5115783E−03 | 7.8023027E−03 |
| A4 | −1.7354919E−02 | −1.0689691E−02 |
| A5 | 2.2386685E−02 | 9.6966097E−03 |
| A6 | −1.5276282E−02 | −3.9914261E−03 |
| A7 | 3.1350200E−03 | −1.2002001E−04 |
| A8 | 2.6653653E−03 | 8.1445546E−04 |
| A9 | −1.9393094E−03 | −2.8017286E−04 |
| A10 | 2.5998419E−04 | −3.9636632E−06 |
| A11 | 1.7720892E−04 | 2.3185531E−05 |
| A12 | −6.8579204E−05 | −4.0771733E−06 |
| A13 | −9.9188983E−07 | −5.2082735E−07 |
| A14 | 4.5920468E−06 | 2.3298727E−07 |
| A15 | −6.0414099E−07 | −1.1418578E−08 |
| A16 | −1.0345902E−07 | −4.3437939E−09 |
| A17 | 2.8011243E−08 | 5.8129007E−10 |
| A18 | −2.2694472E−10 | 1.3062657E−11 |
| A19 | −4.0009448E−10 | −6.2155182E−12 |
| A20 | 2.8985323E−11 | 3.0227519E−13 |

Example 4

Figure 4:
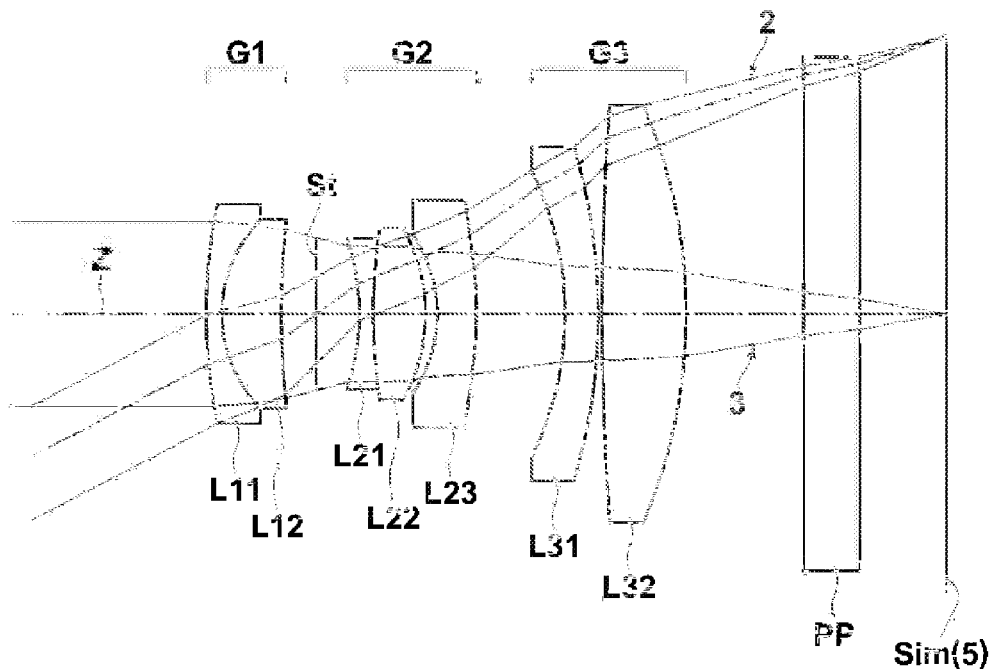
FIG. 4 is a cross-sectional view of an imaging lens of Example 4 of the present invention, illustrating the configuration thereof.

The lens cross-sectional view of the imaging lens of Example 4 is that shown in FIG. 4. The basic lens data and aspherical surface coefficients of the imaging lens of Example 4 are shown in Tables 7 and 8 respectively. The aberration diagrams of the imaging lens of Example 4 are shown in A to D of FIG. 9 respectively.

TABLE 7

Example 4 Basic Lens Data
f = 27.13, BF = 12.30, 2ω = 55.2, Fno. = 2.88

| Si | Ri | Di | Ndj | vdj |
|---|---|---|---|---|
| 1 | 28.154 | 0.80 | 1.59270 | 35.3 |
| 2 | 6.844 | 3.04 | 1.88300 | 40.8 |
| 3 | 44.745 | 1.78 | | |
| 4(St) | ∞ | 2.20 | | |
| 5 | −11.727 | 0.70 | 1.75520 | 27.5 |
| 6 | 29.071 | 2.67 | 1.83481 | 42.7 |
| 7 | −9.058 | 0.60 | | |
| *8 | −6.804 | 1.99 | 1.58313 | 59.5 |
| *9 | −18.112 | 4.50 | | |
| 10 | −16.735 | 1.70 | 1.84666 | 23.8 |
| 11 | −30.255 | 0.20 | | |
| 12 | 147.601 | 4.28 | 1.88300 | 40.8 |
| 13 | −27.296 | 6.00 | | |

TABLE 7-continued

Example 4 Basic Lens Data
f = 27.13, BF = 12.30, 2ω = 55.2, Fno. = 2.88

| Si | Ri | Di | Ndj | vdj |
|---|---|---|---|---|
| 14 | ∞ | 2.80 | 1.51680 | 64.2 |
| 15 | ∞ | | | |

TABLE 8

Example 4 Aspherical Surface Coefficients

| Si | 8 | 9 |
|---|---|---|
| K | 0.0000000E+00 | 0.0000000E+00 |
| A3 | 7.5466615E−03 | 6.7053702E−03 |
| A4 | −1.7307527E−02 | −1.0708295E−02 |
| A5 | 2.2393226E−02 | 9.6939563E−03 |
| A6 | −1.5275929E−02 | −3.9915902E−03 |
| A7 | 3.1350341E−03 | −1.2002676E−04 |
| A8 | 2.6653658E−03 | 8.1445525E−04 |
| A9 | −1.9393094E−03 | −2.8017287E−04 |
| A10 | 2.5998419E−04 | −3.9636633E−06 |
| A11 | 1.7720892E−04 | 2.3185531E−05 |
| A12 | −6.8579204E−05 | −4.0771733E−06 |
| A13 | −9.9188983E−07 | −5.2082735E−07 |
| A14 | 4.5920468E−06 | 2.3298727E−07 |
| A15 | −6.0414099E−07 | −1.1418578E−08 |
| A16 | −1.0345902E−07 | −4.3437939E−09 |
| A17 | 2.8011243E−08 | 5.8129007E−10 |
| A18 | −2.2694472E−10 | 1.3062657E−11 |
| A19 | −4.0009448E−10 | −6.2155182E−12 |
| A20 | 2.8985323E−11 | 3.0227519E−13 |

Example 5

Figure 5:
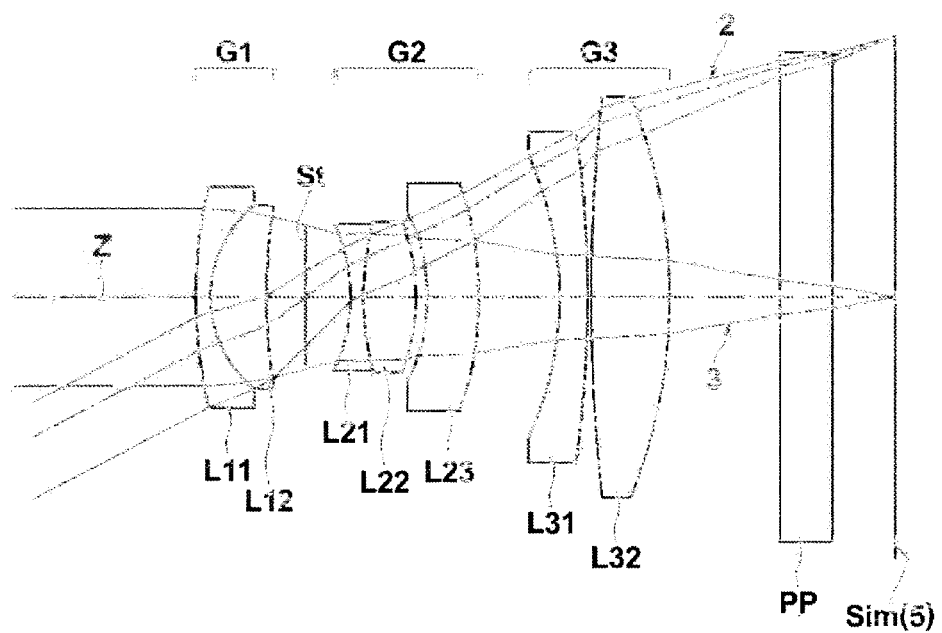
FIG. 5 is a cross-sectional view of an imaging lens of Example 5 of the present invention, illustrating the configuration thereof.

The lens cross-sectional view of the imaging lens of Example 5 is that shown in FIG. 5. The basic lens data and aspherical surface coefficients of the imaging lens of Example 5 are shown in Tables 9 and 10 respectively. The aberration diagrams of the imaging lens of Example 5 are shown in A to D of FIG. 10 respectively.

TABLE 9

Example 5 Basic Lens Data
f = 27.81, BF = 11.27, 2ω = 55.2, Fno. = 2.88

| Si | Ri | Di | Ndj | vdj |
|---|---|---|---|---|
| 1 | 26.053 | 0.80 | 1.59270 | 35.3 |
| 2 | 6.457 | 3.04 | 1.88300 | 40.8 |
| 3 | 30.578 | 2.14 | | |
| 4(St) | ∞ | 2.44 | | |
| 5 | −9.548 | 0.70 | 1.59270 | 35.3 |
| 6 | 15.870 | 2.86 | 1.72916 | 54.7 |
| 7 | −11.381 | 0.60 | | |
| *8 | −11.898 | 2.80 | 1.58313 | 59.5 |
| *9 | −20.798 | 4.39 | | |
| 10 | −18.450 | 1.52 | 1.80518 | 25.4 |
| 11 | −64.769 | 0.20 | | |
| 12 | 100.010 | 4.27 | 1.90366 | 31.3 |
| 13 | −29.001 | 6.00 | | |
| 14 | ∞ | 2.80 | 1.51680 | 64.2 |
| 15 | ∞ | | | |

TABLE 10

Example 5 Aspherical Surface Coefficients

| Si | 8 | 9 |
|---|---|---|
| K | 0.0000000E+00 | 0.0000000E+00 |
| A3 | 7.0620023E−03 | 6.3586846E−03 |
| A4 | −1.7499231E−02 | −1.1023944E−02 |
| A5 | 2.2378175E−02 | 9.6878003E−03 |
| A6 | −1.5275947E−02 | −3.9913235E−03 |
| A7 | 3.1350874E−03 | −1.1999457E−04 |
| A8 | 2.6653708E−03 | 8.1445734E−04 |
| A9 | −1.9393091E−03 | −2.8017275E−04 |
| A10 | 2.5998420E−04 | −3.9636577E−06 |
| A11 | 1.7720892E−04 | 2.3185531E−05 |
| A12 | −6.8579204E−05 | −4.0771733E−06 |
| A13 | −9.9188983E−07 | −5.2082735E−07 |
| A14 | 4.5920468E−06 | 2.3298727E−07 |
| A15 | −6.0414099E−07 | −1.1418578E−08 |
| A16 | −1.0345902E−07 | −4.3437939E−09 |
| A17 | 2.8011243E−08 | 5.8129007E−10 |
| A18 | −2.2694472E−10 | 1.3062657E−11 |
| A19 | −4.0009448E−10 | −6.2155182E−12 |
| A20 | 2.8985323E−11 | 3.0227519E−13 |

Table 11 shows values corresponding to the conditional expressions (0) to (8) and values related to the conditional expressions with respect to Examples 1 to 5. The values shown in Table 11 are those with respect to the d-line.

TABLE 11

| | | Example 1 | Example 2 | Example 3 | Example 4 | Example 5 |
|---|---|---|---|---|---|---|
| | TL | 39.74 | 35.62 | 33.38 | 36.77 | 37.03 |
| | Y | 14.20 | 14.20 | 14.20 | 14.20 | 14.20 |
| | Σd | 26.73 | 24.39 | 22.15 | 24.47 | 25.76 |
| | f | 29.19 | 24.83 | 21.82 | 27.13 | 27.81 |
| | ST | 34.68 | 31.11 | 28.87 | 31.15 | 31.05 |
| | f1 | 21.11 | 20.42 | 20.15 | 21.98 | 23.93 |
| | f2 | −57.76 | −74.44 | −90.26 | −66.56 | −317.79 |
| | f12 | 32.40 | 29.45 | 27.10 | 32.38 | 29.34 |
| C/E (0) | f/f2 | −0.51 | −0.33 | −0.24 | −0.41 | −0.09 |
| C/E (1) | TL/Y | 2.80 | 2.51 | 2.35 | 2.59 | 2.61 |
| C/E (2) | Σd/TL | 0.67 | 0.68 | 0.66 | 0.67 | 0.70 |
| C/E (3) | Y/f | 0.49 | 0.57 | 0.65 | 0.52 | 0.51 |
| C/E (4) | ST/TL | 0.87 | 0.87 | 0.86 | 0.85 | 0.84 |
| C/E (5) | f/f1 | 1.38 | 1.22 | 1.08 | 1.23 | 1.16 |
| C/E (6) | Nd1p | 1.91082 | 1.75500 | 1.88300 | 1.88300 | 1.88300 |
| C/E (7) | vd1p | 35.3 | 52.3 | 40.8 | 40.8 | 40.8 |
| C/E (8) | f12/f | 1.11 | 1.19 | 1.24 | 1.19 | 1.05 |

C/E: Conditional Expression

As is known from the data shown above, each of the imaging lenses of Example 1 to 5 is formed compact and inexpensively in which the entire system is composed of seven lenses, has an F-number of 2.88, and has high optical performance compatible with a large image sensor as various types of aberrations are corrected satisfactorily.

An imaging apparatus according to an embodiment of the present invention will now be described. FIG. 11 illustrates a perspective shape of a camera according to an embodiment of the present invention. The camera 10 shown here is a compact digital camera and includes an imaging lens 12 according to an embodiment of the present invention on the front surface and inside the camera body 11, a flashing device 13 for emitting flash light onto a subject on the front surface of the camera body 11, a shutter button 15 and a power button 16 on the upper surface of the camera body 11, and an image sensor 17 inside the camera body 11. The image sensor 17 captures an optical image formed by the small wide angle lens 12 and converts the captured optical image to an electrical signal, and is formed, for example, of a CCD, a CMOS, or the like.

As described above, the imaging lens 12 according to an embodiment of the present invention is sufficiently downsized so that the camera 10 can be a compact camera both at the time of carrying and at the time of performing imaging without employing a retractable system. If a retractable system is employed, the camera 10 may be further compact and high portability camera in comparison with conventional retractable lens cameras. Further, the camera 10 provided with the imaging lens 12 according to an embodiment of the present invention may perform imaging with high image quality.

Next, another embodiment of the imaging apparatus of the present invention will be described with reference to FIGS. 12A and 12B. A camera 30 whose perspective views are illustrated in FIGS. 12A and 12B is a single-lens digital still camera without reflex viewfinder to which an interchangeable lens 20 is removably attached. FIG. 12A illustrates an external view of the camera 30 viewed from the front side while FIG. 12B illustrates an external view of the camera 30 viewed from the rear side.

The camera 30 is provided with a camera body 31 and includes a shutter button 32 and a power button on the upper surface of the camera body 31. Operation parts 34 and 35, and a display 36 are provided on the rear surface of the camera body 31. The display 36 is used for displaying a captured image or an image within the angle of view before being captured.

The camera body 31 is provided with an imaging aperture from which light from an imaging target enters in the front center thereof and a mount 37 is provided at the position corresponding to the imaging aperture, whereby the interchangeable lens 20 is mounted on the camera body 31 via the mount 37. The interchangeable lens 20 includes a lens barrel in which an imaging lens 1 according to an embodiment of the present invention is accommodated.

The camera body 31 includes inside thereof an image sensor, such as a CCD or the like, (not shown) that receives a subject image formed by the interchangeable lens 20 and outputs an image signal according to the received subject image, a signal processing circuit that processes the image signal outputted from the image sensor and generates an image, a recording medium for recording the generated image, and the like. In the camera 30, imaging of one frame of still image is performed when the shutter button 32 is pressed and the image data obtained by the imaging are recorded on the recording medium.

The use of an imaging lens according to an embodiment of the present invention in the interchangeable lens 20 used for the camera 30 allows the camera 30 to be sufficiently compact in the lens mounted state and to perform imaging with high image quality.

So far the present invention has been described by way of embodiments and examples, but the present invention is not limited to the aforementioned embodiments and examples and various modifications may be made. For example, the values of radius of curvature of each lens, surface distance, refractive index, Abbe number, aspherical surface coefficient, and the like are not limited to those shown in each example and may take other values.

In the embodiments of the imaging apparatus, the description has been made of cases in which the imaging lens of the present invention is applied to a compact digital camera and a single-lens digital still camera without reflex viewfinder, but the imaging lens of the present invention is not limited to such applications and may be applied, for example, to single-lens reflex cameras, film cameras, video cameras, and the like.

The invention claimed is:

1. An imaging lens composed of a first lens group having a positive refractive power, an aperture stop, a second lens group having a negative refractive power, and a third lens group having a positive refractive power disposed in order from the object side, wherein:

the first lens group includes one negative lens and one positive lens disposed in order from the object side;

the second lens group is composed of three lenses or less, includes one negative lens and one positive lens, and has at least one aspherical surface, wherein the most object side surface of the second lens group is a concave surface and the most image side surface of the second lens group is a convex surface;

the third lens group is composed of one negative lens with a concave surface on the object side and one or more positive lenses disposed in order from the object side; and only the first and second lens groups are integrally moved to the object side when focus adjustment is performed from an object at infinity to an object at proximity.

2. The imaging lens of claim 1, wherein the imaging lens satisfies a conditional expression:

$$-0.51 \leq f/f2 \leq -0.09$$

where:
f: the focal length of the entire system; and
f2: the focal length of the second lens group.

3. An imaging lens composed of a first lens group having a positive refractive power, an aperture stop, a second lens group having a negative refractive power, and a third lens group having a positive refractive power disposed in order from the object side, wherein:

the first lens group includes one negative lens and one positive lens disposed in order from the object side;

the second lens group is composed of three lenses or less, includes one negative lens and one positive lens, and has at least one aspherical surface, wherein the most object side surface of the second lens group is a concave surface and the most image side surface of the second lens group is a convex surface;

the third lens group is composed of one negative lens with a concave surface on the object side and one or more positive lenses disposed in order from the object side; and the second lens group is composed of three lenses of a negative lens with a concave surface on the object side, a positive lens with a convex surface on the image side, and an aspherical lens disposed in order from the object side.

4. An imaging lens composed of a first lens group having a positive refractive power, an aperture stop, a second lens group having a negative refractive power, and a third lens group having a positive refractive power disposed in order from the object side, wherein:
the first lens group includes one negative lens and one positive lens disposed in order from the object side;
the second lens group is composed of three lenses or less, includes one negative lens and one positive lens, and has at least one aspherical surface, wherein the most object side surface of the second lens group is a concave surface and the most image side surface of the second lens group is a convex surface;
the third lens group is composed of one negative lens with a concave surface on the object side and one or more positive lenses disposed in order from the object side; and
the imaging lens satisfies a conditional expression (1) given below:

$$2.1 < TL/Y < 3.0 \tag{1}$$

where:
TL: the distance from the most object side lens surface of the first lens group to the image plane on the optical axis in which air equivalent length is used for the back focus portion; and
Y: the maximum image height.

5. The imaging lens as claimed in claim 4, wherein the imaging lens satisfies a conditional expression (1-1) given below:

$$2.2 < TL/Y < 2.9 \tag{1-1}$$

6. The imaging lens as claimed in claim 1, wherein the imaging lens satisfies a conditional expression (2) given below:

$$0.50 < \Sigma d/TL < 0.85 \tag{2}$$

where:
Σd: the distance from the most object side lens surface of the first lens group to the most image side lens surface of the third lens group on the optical axis; and
TL: the distance from the most object side lens surface of the first lens group to the image plane on the optical axis in which air equivalent length is used for the back focus portion.

7. The imaging lens as claimed in claim 6, wherein the imaging lens satisfies a conditional expression (2-1) given below:

$$0.55 < \Sigma d/TL < 0.80 \tag{2-1}$$

8. The imaging lens as claimed in claim 1, wherein the imaging lens satisfies a conditional expression (3) given below:

$$0.35 < Y/f < 0.85 \tag{3}$$

where:
Y: the maximum image height; and
f: the focal length of the entire system.

9. The imaging lens as claimed in claim 8, wherein the imaging lens satisfies a conditional expression (3-1) given below:

$$0.40 < Y/f < 0.82 \tag{3-1}$$

10. The imaging lens as claimed in claim 1, wherein the imaging lens satisfies a conditional expression (4) given below:

$$0.70 < ST/TL < 0.95 \tag{4}$$

where:
ST: the distance from the aperture stop to the image plane on the optical axis in which air equivalent length is used for the back focus portion; and
TL: the distance from the most object side lens surface of the first lens group to the image plane on the optical axis in which air equivalent length is used for the back focus portion.

11. The imaging lens as claimed in claim 10, wherein the imaging lens satisfies a conditional expression (4-1) given below:

$$0.75 < ST/TL < 0.92 \tag{4-1}$$

12. The imaging lens as claimed in claim 1, wherein the imaging lens satisfies a conditional expression (5) given below:

$$0.7 < f/f1 < 1.6 \tag{5}$$

where:
f: the focal length of the entire system; and
f1: the focal length of the first lens group.

13. The imaging lens as claimed in claim 1, wherein the first lens group is composed of two lenses of a negative meniscus lens having a convex surface on the object side and a positive lens disposed in order from the object side.

14. The imaging lens as claimed in claim 13, wherein the two lenses constituting the first lens group is cemented to each other.

15. The imaging lens as claimed in claim 1, wherein the first and second lenses of the second lens group from the object side are a negative lens and a positive lens respectively and the two lenses are cemented to each other.

16. The imaging lens as claimed in claim 1, wherein the one positive lens included in the first lens group satisfies conditional expressions (6) and (7) given below:

$$Nd1p > 1.70 \tag{6}$$

$$30 < vd1p < 58 \tag{7}$$

where:
Nd1p: the refractive index of the one positive lens included in the first lens group with respect to the d-line; and
vd1p: the Abbe number of the one positive lens included in the first lens group with respect to the d-line.

17. The imaging lens as claimed in claim 1, wherein the third lens group is composed of two lenses of a negative lens and a positive lens.

18. The imaging lens as claimed in claim 1, wherein the imaging lens satisfies a conditional expression (8) given below:

$$0.9 < f12/f < 1.5 \tag{8}$$

where
f12: the combined focal length of the first and second lens groups; and
f: the focal length of the entire system.

19. An imaging apparatus, comprising the imaging lens as claimed in claim 1.

* * * * *